US010896415B2

(12) United States Patent
Wadhwa et al.

(10) Patent No.: US 10,896,415 B2
(45) Date of Patent: Jan. 19, 2021

(54) SYSTEM FOR EXECUTING A COMPUTER PROCESS FOR PROCESSING A TRANSACTION, AND RELATED COMPUTER PROCESS

(71) Applicant: Mastercard International Incorporated, Purchase, NY (US)

(72) Inventors: Ravinder Wadhwa, Maharashtra (IN); Piyush Sharma, Maharashtra (IN); Navneet Jain, Maharashtra (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 58 days.

(21) Appl. No.: 16/164,065

(22) Filed: Oct. 18, 2018

(65) Prior Publication Data

US 2019/0114607 A1 Apr. 18, 2019

(51) Int. Cl.
*G06Q 20/20* (2012.01)
*G06Q 20/38* (2012.01)
(Continued)

(52) U.S. Cl.
CPC ......... *G06Q 20/204* (2013.01); *G06Q 20/027* (2013.01); *G06Q 20/20* (2013.01);
(Continued)

(58) Field of Classification Search
CPC .... G06Q 20/204; G06Q 20/027; G06Q 20/20; G06Q 20/202; G06Q 20/3821; G06Q 20/401; G07F 7/0886
See application file for complete search history.

(56) References Cited

U.S. PATENT DOCUMENTS

| 2014/0074723 | A1 | 3/2014 | Kamat | |
|---|---|---|---|---|
| 2016/0034876 | A1* | 2/2016 | Speiser | G06Q 30/06 |
| | | | | 705/21 |
| 2017/0017958 | A1 | 1/2017 | Scott et al. | |

FOREIGN PATENT DOCUMENTS

| WO | WO 2002/101512 A2 | 12/2002 | |
|---|---|---|---|
| WO | WO 2012/141588 A1 | 10/2012 | |
| WO | WO-2012141588 A1 * | 10/2012 | ............. G06Q 30/04 |

OTHER PUBLICATIONS

International Search Report and Written Opinion dated Nov. 26, 2018 in International Application No. PCT/US2018/048234.

* cited by examiner

*Primary Examiner* — Paul Danneman
(74) *Attorney, Agent, or Firm* — Baker Botts L.L.P.

(57) ABSTRACT

Disclosed is a system for executing a computer process for processing a transaction. The system comprises a point-of-sale (POS) terminal, and an application support terminal (AST). The POS terminal comprises a POS processor and a POS memory device in communication with the POS processor and storing POS program instructions thereon. The POS processor is operative with the POS program instructions to receive transaction information comprising payment vehicle credentials of a payment vehicle for use in processing the transaction, and transaction details defining the transaction. The POS processor is further operative to determine, based on the transaction information, that the POS terminal cannot process the transaction, send the transaction information to the AST, the AST comprising an AST processor, and an AST memory device in communication with the AST processor and storing an application capable of processing the transaction using the payment vehicle credentials, and AST program instructions thereon. The AST processor is operative with the application and AST program (Continued)

instructions to process payment for the transaction through the AST, and forward a transaction confirmation notification from the AST to the POS terminal, the transaction confirmation notification specifying whether the transaction was successfully or unsuccessfully processed.

19 Claims, 8 Drawing Sheets

(51) Int. Cl.
    *G06Q 20/40*     (2012.01)
    *G06Q 20/02*     (2012.01)
    *G07F 7/08*     (2006.01)

(52) U.S. Cl.
    CPC ....... *G06Q 20/202* (2013.01); *G06Q 20/3821* (2013.01); *G06Q 20/401* (2013.01); *G07F 7/0886* (2013.01)

SYSTEM FOR EXECUTING A COMPUTER PROCESS FOR PROCESSING A TRANSACTION, AND RELATED COMPUTER PROCESS

CROSS-REFERENCE TO RELATED APPLICATIONS

This application claims priority to Singapore Patent Application No. 10201708570X filed on 18 Oct. 2017, which is hereby incorporated by reference in its entirety.

FIELD OF THE INVENTION

The present disclosure relates to a system for executing a computer process for processing a transaction, and a computer process is executed by that system.

BACKGROUND

For existing merchants, a single commercial outlet or premises will have multiple point-of-sale (POS) terminals. Each POS terminal governs purchases made through a particular point of exit from the commercial premises. In some cases, mobile POS terminals can be used to facilitate purchases at non-exit points, or even outside the commercial premises.

A POS terminal is typically loaded with a set of primary applications, such as credit and debit applications for specific payment schemes (e.g. MasterCard® and Visa®) and credit and debit card issuers (e.g. Citibank® and American Express®). POS terminals may also have secondary applications that can be affiliated with the primary applications—for example, an American Express terminal application or a telephone usage pre-payment application.

A POS terminal is only able to process transactions for cards—e.g. credit and debit cards—for which it has the appropriate application. For applications for types of cards that are not supported by the POS terminal, a staff member of the merchant must locate a different POS terminal with the relevant application and process the transaction using that different terminal.

In these circumstances, where the merchant has no terminal on which the appropriate application is installed, the transaction cannot be processed.

A further problem is that where a merchant has multiple POS terminals, each POS terminal must be serviced and updated each time a new application, or a new update for an existing application, is desired to be installed. This increases the time and cost taken to manage and maintain the POS terminals.

It is desirable therefore to provide a means for overcoming or ameliorating one or more of the above-mentioned disadvantages with existing systems, or at least provide a useful alternative.

SUMMARY

The present disclosure provides a central host system for executing a computer process, between a point-of-sale (POS) terminal and an application support terminal (AST), for processing a transaction, the central host system comprising:
  a host processor; and
  a host memory device in communication with the host processor and storing host program instructions thereon, the host processor operative with the host program instructions to:
    receive transaction information from the POS terminal, the transaction information comprising:
      payment vehicle credentials of a payment vehicle for use in processing the transaction; and
      transaction details defining the transaction,
    the POS terminal being unable to process the transaction;
    identify the AST based on the AST comprising an application capable of processing the application using the payment vehicle credentials; and
    send the transaction information to the application support terminal to facilitate processing of payment for the transaction by the AST.

The host processor may further be operative with the host program instructions to:
  receive a transaction confirmation notification (e.g. from the AST or directly from the issuer), and forward the transaction confirmation notification to the POS terminal, the transaction confirmation notification specifying whether the transaction was successfully or unsuccessfully processed.

The AST may be one of a plurality of supplementary POS terminals, each supplementary POS terminal comprising one or more applications, each application being for processing a particular type of transaction, and the host processor may be operative with the host program instructions to identify the AST from the plurality of supplementary POS terminals based on the application support terminal comprising the application capable of processing the application using the payment vehicle credentials.

The central host system may be operative with the host program instructions to identify the AST from the plurality of supplementary POS terminals by:
  identifying at least two supplementary POS terminals each comprising the application capable of processing the transaction using the payment vehicle credentials; and
  polling the at least two supplementary POS terminals to ascertain which of the at least two supplementary POS terminals is not currently involved in processing a transaction, and the send the transaction information to the AST, the AST being the first of the at least two supplementary POS terminals to respond with a notification advising it is not currently involved in processing a transaction.

Also disclosed herein is an application support terminal (AST) for processing a transaction, the AST comprising:
  an AST processor; and
  an AST memory device in communication with the AST processor and storing an application capable of processing the transaction using the payment vehicle credentials, and AST program instructions thereon, the AST processor operative with the application and AST program instructions to:
    receive transaction information from a point-of-sale (POS) terminal, the transaction information comprising:
      payment vehicle credentials of a payment vehicle for use in processing the transaction; and
      transaction details defining the transaction,
    process payment for the transaction; and
    forward a transaction confirmation notification to the POS terminal, the transaction confirmation notification specifying whether the transaction was successfully or unsuccessfully processed.

The AST processor may be operative with the application and AST program instructions to receive the transaction information from the POS terminal via a central host system.

The AST processor may be operative with the application and AST program instructions to forward the transaction confirmation notification to the POS terminal via the central host system.

The AST processor may be operative with the application and AST program instructions to:

receive a polling request from the central host system, the polling request requesting confirmation the AST is available to process the transaction; and responding to the polling request by confirming the AST is available to process the transaction.

Further, disclosed herein is a point-of-sale (POS) terminal comprising:

a POS processor; and a POS memory device in communication with the POS processor and storing POS program instructions thereon, the POS processor operative with the POS program instructions to:

receive transaction information comprising:

payment vehicle credentials of a payment vehicle for use in processing the transaction; and transaction details defining the transaction;

determine, based on the transaction information, that the POS terminal cannot process the transaction;

send the transaction information to an application support terminal (AST), for processing the transaction, the AST comprising an application capable of processing the transaction using the payment vehicle credentials; and receive a transaction confirmation notification from the AST, the transaction confirmation notification specifying whether the transaction was successfully or unsuccessfully processed.

The POS memory device may further store at least one POS application, and the POS terminal is operative with the POS program instructions to determine that the POS terminal cannot process the transaction by:

comparing the payment vehicle credentials to one or more predetermined payment vehicle credential formats for each POS application; and determining that the payment vehicle credentials conform to none of the one or more predetermined payment vehicle credential formats.

The POS memory device may store at least one POS application, the POS terminal being operative with the POS program instructions to determine that the POS terminal cannot process the transaction by:

identifying a type of the payment vehicle based on the payment vehicle credentials;

comparing the type of the payment vehicle to one or more types of transaction capable of being processed by an application of the at least one application; and determining that a type of the transaction associated with the payment vehicle is none of the one or more types of transaction.

The POS memory device may store at least one POS application, the POS terminal being operative with the POS program instructions to determine that the POS terminal cannot process the transaction by:

identifying a type of the transaction;

comparing the type of the transaction to one or more types of transaction capable of being processed by an application of the at least one POS application; and determining that the type of the transaction is none of the one or more types of transaction.

The POS terminal may be configured to identify the type of the transaction by identifying a type of the payment vehicle based on the payment vehicle credentials.

The POS terminal may be configured to identify the type of the transaction by determining, based on the transaction details, whether the transaction is a credit transaction, a debit transaction, a refund transaction, or a loyalty program transaction.

The present disclosure provides a system for executing a computer process for processing a transaction, the system comprising:

a point-of-sale (POS) terminal; and an application support terminal (AST), wherein the POS terminal comprises:

a POS processor; and a POS memory device in communication with the POS processor and storing POS program instructions thereon, the POS processor operative with the POS program instructions to:

receive transaction information comprising:

payment vehicle credentials of a payment vehicle for use in processing the transaction; and transaction details defining the transaction;

determine, based on the transaction information, that the POS terminal cannot process the transaction;

send the transaction information to the AST, the AST comprising:

an AST processor; and an AST memory device in communication with the AST processor and storing an application capable of processing the transaction using the payment vehicle credentials, and AST program instructions thereon, the AST processor operative with the application and AST program instructions to:

process payment for the transaction through the AST; and forward a transaction confirmation notification from the AST to the POS terminal, the transaction confirmation notification specifying whether the transaction was successfully or unsuccessfully processed.

The POS memory device may further store at least one POS application, and the POS terminal is operative with the POS program instructions to determine that the POS terminal cannot process the transaction by:

comparing the payment vehicle credentials to one or more predetermined payment vehicle credential formats for each POS application; and determining that the payment vehicle credentials conform to none of the one or more predetermined payment vehicle credential formats.

The POS memory device may store at least one POS application, and the POS terminal is operative with the POS program instructions to determine that the POS terminal cannot process the transaction by:

identifying a type of the payment vehicle based on the payment vehicle credentials;

comparing the type of the payment vehicle to one or more types of transaction capable of being processed by an application of the at least one application; and determining that the type of a transaction associated with the payment vehicle is none of the one or more types of transaction.

The POS memory device stores at least one POS application, and the POS terminal is operative with the POS program instructions to determine that the POS terminal cannot process the transaction by:

identifying a type of the transaction;

comparing the type of the transaction to one or more types of transaction capable of being processed by an application of the at least one POS application; and determining that the type of the transactions is none of the one or more types of transaction.

The POS terminal is configured to identify the type of the transaction by identifying a type of the payment vehicle based on the payment vehicle credentials.

The term "configured" means the associated memory device comprises program instructions that, when executed by the one or more processors, result in the POS terminal being operative to perform the function for which it is said to be 'configured'.

The POS terminal may be configured to identify the type of the transaction by determining, based on the transaction details, whether the transaction is a credit transaction, a debit transaction, a refund transaction, or a loyalty program transaction.

The system may comprise a central host system, wherein the POS terminal is configured to send the transaction information to the application support terminal by sending the transaction information to the central host system, and the central host system comprises:

a host processor; and a host memory device in communication with the host processor and storing host program instructions thereon, the host processor operative with the host program instructions to:

send the transaction information from the central host system to the application support terminal.

The system may comprise a plurality of supplementary POS terminals including the application support terminal, each supplementary POS terminal comprising one or more applications, each application being for processing a particular type of transaction, and wherein the central host system is operative with the host program instructions to send the transaction information from the central host system to the application support terminal by:

identifying, at the central host system, the application support terminal from the plurality of supplementary POS terminals based on the application support terminal comprising the application capable of processing the application using the payment vehicle credentials; and sending the transaction information to the application support terminal.

The central host system may be operative with the host program instructions to identify the application support terminal from the plurality of supplementary POS terminals by:

identifying at least two supplementary POS terminals each comprising the application capable of processing the transaction using the payment vehicle credentials;

polling the at least two supplementary POS terminals to ascertain which of the at least two supplementary POS terminals is not currently involved in processing a transaction; and sending the transaction information to the application support terminal, the application support terminal being the first of the at least two supplementary POS terminals to respond with a notification advising it is not currently involved in processing a transaction.

The present disclosure also provides a computer process for processing a transaction, comprising:

receiving, at a point-of-sale (POS) terminal, transaction information comprising:

payment vehicle credentials of a payment vehicle for use in processing the transaction; and transaction details defining the transaction;

determining, at the POS terminal and based on the transaction information, that the POS terminal cannot process the transaction;

sending the transaction information to an application support terminal, the application support terminal comprising an application capable of processing the transaction using the payment vehicle credentials;

processing payment for the transaction through the application support terminal using the application; and forwarding a transaction confirmation notification from the application support terminal to the POS terminal, the transaction confirmation notification specifying whether the transaction was successfully or unsuccessfully processed.

The POS terminal may comprise at least one application, and determining that the POS terminal cannot process the transaction comprises:

comparing the payment vehicle credentials to one or more predetermined payment vehicle credential formats for each application; and determining that the payment vehicle credentials conform to none of the one or more predetermined payment vehicle credential formats.

The POS terminal may comprise at least one application, and determining that the POS terminal cannot process the transaction comprises:

identifying a type of the payment vehicle based on the payment vehicle credentials;

comparing the type of the payment vehicle to one or more types of transaction capable of being processed by an application of the at least one application; and determining that a type of the transaction associated with the payment vehicle is none of the one or more types of transaction.

The POS terminal may comprise at least one application, and determining that the POS terminal cannot process the transaction comprises:

identifying a type of the transaction;

comparing the type of the transaction to one or more types of transaction capable of being processed by an application of the at least one application; and determining that the type of the transactions is none of the one or more types of transaction.

Identifying the type of the transaction may comprise identifying a type of the payment vehicle based on the payment vehicle credentials.

Identifying the type of the transaction may comprise determining, based on the transaction details, whether the transaction is a credit transaction, a debit transaction, a refund transaction, or a loyalty program transaction.

Sending the transaction information to the application support terminal may comprise:

sending the transaction information to a central host system; and sending the transaction information from the central host system to the application support terminal.

The application support terminal may be one of a plurality of supplementary POS terminals, each supplementary POS terminal comprising one or more applications, each application being for processing a particular type of transaction, and wherein sending the transaction information from the central host system to the application support terminal comprises:

identifying, at the central host system, the application support terminal from the plurality of supplementary POS terminals based on the application support terminal comprising the application capable of processing the application using the payment vehicle credentials; and sending the transaction information to the application support terminal.

Identifying the application support terminal from the plurality of supplementary POS terminals may comprise:

identifying at least two supplementary POS terminals each comprising the application capable of processing the transaction using the payment vehicle credentials;

polling the at least two supplementary POS terminals to ascertain which of the at least two supplementary POS terminals is not currently involved in processing a transaction; and sending the transaction information to the application support terminal, the application support terminal being the first of the at least two supplementary POS terminals to respond with a notification advising it is not currently involved in processing a transaction.

BRIEF DESCRIPTION OF THE DRAWINGS

Some embodiments of the present invention will now be described by way of non-limiting example only, with reference to the accompanying drawings in which.

DETAILED DESCRIPTION

Embodiments of the present invention provide a system and computer process or method for executing a transaction, such as a financial transaction, a rewards or loyalty points transaction or otherwise. The system enables a POS terminal to facilitate transaction for which it does not have the relevant application installed. This enables a merchant to update fewer copies/instances of the necessary applications, since multiple POS terminals can use a single instance of any one application, installed on a single POS terminal or other device. This also removes inconvenience for the consumer insofar as they are only required to visit a single terminal regardless of whether that terminal, in itself, is capable of processing the transaction using a payment vehicle of the consumer.

An example of a method for performing a transaction will now be described with reference to FIG. 1.

For the purpose of these examples, it is assumed that the transactions are performed in part utilising one or more client devices (e.g. mobile devices such as smart phones, personal digital assistants, laptops etc) that in use interact with one or more payment processing devices (e.g. transaction terminals such as EFTPOS machines, ATMs etc). The payment processing device(s) are typically part of one or more processing systems, such as one or more servers, and may form part of a payment network backend, or similar. For the following description, reference will generally be made to a single transaction terminal, but it will be appreciated that the functionality performed by the payment transaction terminal could in practice be distributed across multiple terminals and reference to a single device is not intended to be limiting.

Figure 1:
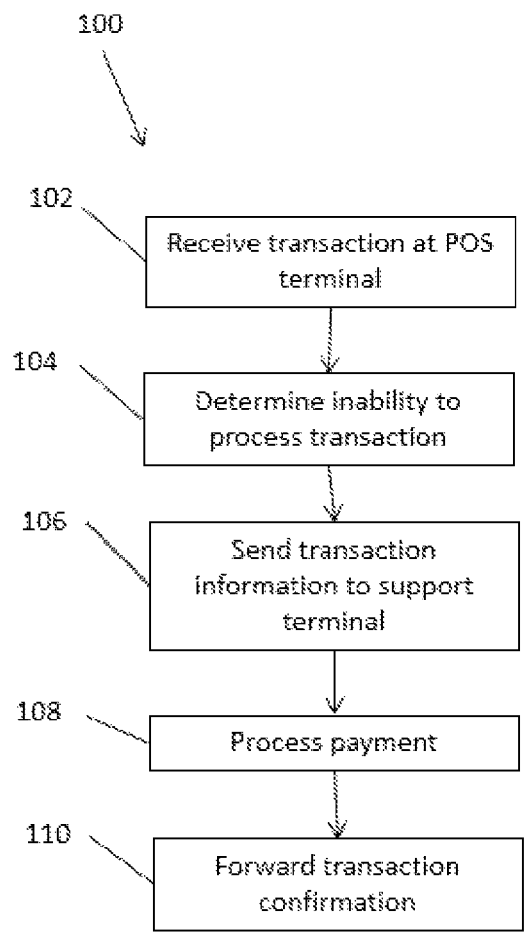
FIG. 1 illustrates a computer process for processing a transaction in accordance with some embodiments of the present invention.

A computer process 100 for executing a transaction in accordance with the present disclosure is represented in FIG. 1. The process 100 may be between a merchant and consumer, such that the consumer endeavours to purchase something (e.g. products or services) from the merchant. The process 100 can enable a merchant or consumer to process a transaction through a POS terminal, where the transaction involves a payment vehicle (e.g. credit card, debit card, loyalty program card) for which the POS terminal does not have an appropriate application installed. In this context an "appropriate application" is the application necessary for processing transactions involving the payment vehicle in question.

The process 100 may also enable fewer instances of any particular application relevant to a particular payment vehicle, to be installed on fewer POS terminals. Consequently, less time and cost is needed to update the applications or to install them. Where a transaction is attempted at a POS terminal that does not have an appropriate application installed, the POS terminal forwards relevant information to a further POS terminal that does have the appropriate application installed. The further POS terminal processes the transaction and sends a confirmation notification back to the original POS terminal to advise the transaction has been processed.

The process 100, which may interchangeably be referred to as a method, broadly comprises:

Step 102: receiving transaction information at a POS terminal;

Step 104: determining the inability of the POS terminal to process the transaction;

Step 106: sending transaction information to an application support terminal;

Step 108: processing payment through the application support terminal; and

Step 110: forwarding a transaction confirmation notification from the application support terminal to the POS terminal.

Figure 2:
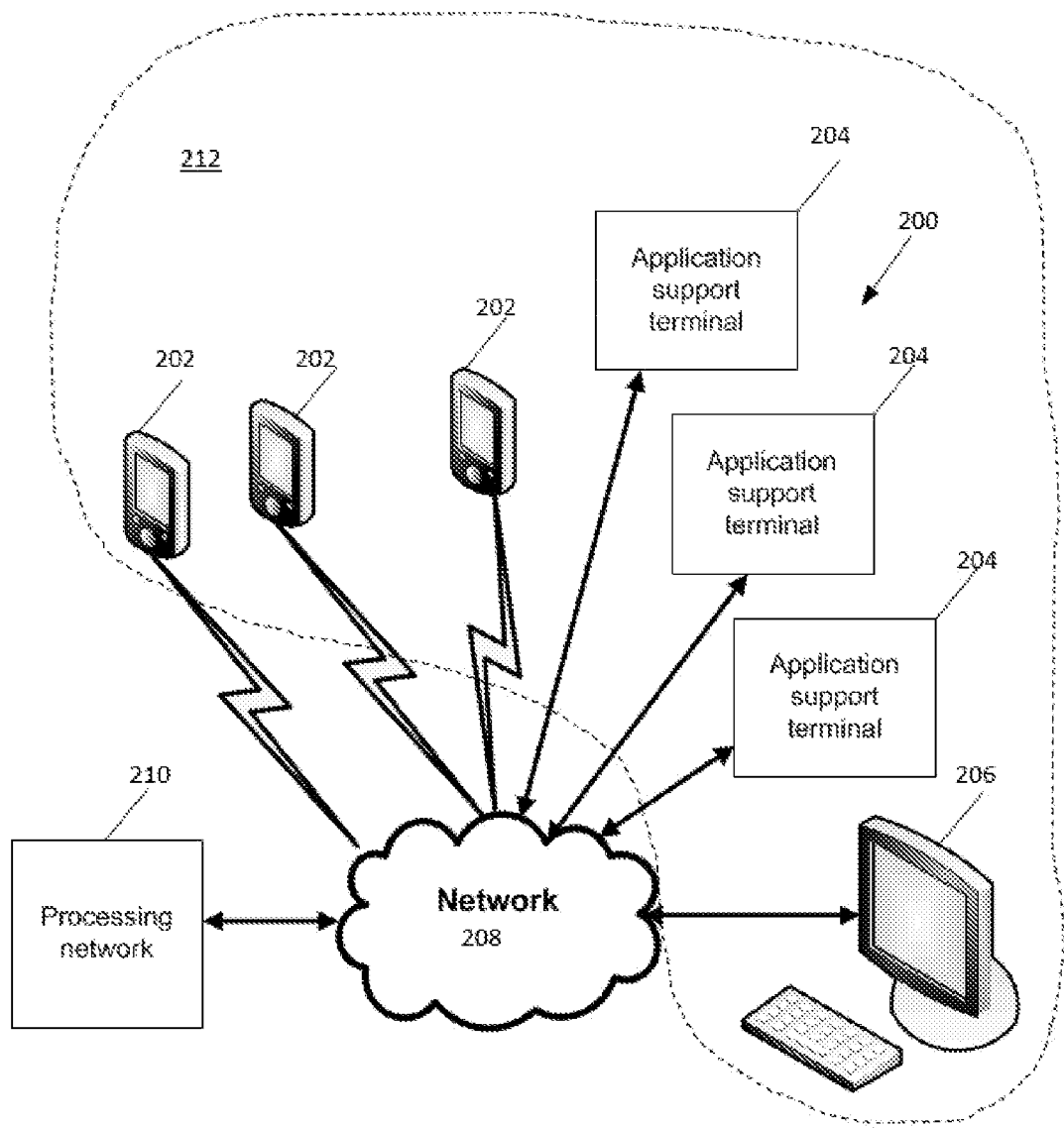
FIG. 2 illustrates a system for executing a computer process for processing a transaction in accordance with some embodiments of the present invention.

Step 102 involves receiving transaction information at a point-of-sale (POS) terminal (e.g. POS terminal 202 of FIG. 2). The transaction information is information necessary for a POS terminal or other system or device, whether or not it is POS terminal 202, to process the transaction. Transaction information may be scanned from a payment vehicle, or products to be purchased, in a known manner such as using a scanner or manual entry, or derived in any other appropriate manner. Transaction information may also be added to and/or otherwise modified as needed to enable processing of the transaction.

The transaction information may include the personal identification number (PIN) of the consumer, biometric data for the consumer, or any other authentication information by which the identity of the consumer can be confirmed. The transaction information may further include a merchant identifier (MID) for identifying the merchant through whom the transaction is being placed—e.g. the owner of the POS terminal. The transaction information may also include a transaction identifier for identifying the transaction. In addition, a POS terminal may add its machine access control (MAC address), or other identifier, to the transaction information so that a response from an issuer, another POS terminal or other system or device can be appropriately routed to the POS terminal from which the transaction information was received in step 102. The POS terminal may also identify a system (e.g. a further POS terminal or a central host system) by the MAC address of that system, and use the MAC address to send the transaction information to that system.

In another example, where one POS terminal forwards the transaction information to a further POS terminal for processing, the further POS terminal may substitute or add its own MAC address or identifier (unique or otherwise) to the transaction information before sending it to the acquirer, issuer or other party for processing the transaction. Thus the issuer, acquirer or other party sends the response (transaction successful or declined) to the further POS terminal using the MAC address or identifier for the further POS terminal. The further POS terminal then forwards the response to the "one" POS terminal using the relevant MAC address or identifier. Where the further POS terminal adds its MAC address to the transaction information, rather than substituting its MAC address for the MAC address of the POS terminal from which the transaction information was received (the original POS terminal), the issuer, acquirer or other party can send transaction confirmation directly to the original POS terminal in accordance with step 110, rather than sending transaction confirmation via the further POS terminal. Similarly, the central host system 206 may add its MAC address to the transaction information. Thus the transaction confirmation (along with any other relevant information, such as a transaction identifier) can be sent directly to the central host system 206 and the central host system can then use the MAC address to forward the confirmation to the POS terminal.

In this case, "processing" a transaction is the process of governing exchange of funds, loyalty rewards points and other tradable currency or currency equivalents for whatever a consumer is intending to buy from the merchant in the transaction in question (presently represented by all of the terminals and servers indicated in FIG. 2 by reference numeral 212). The processing of transaction is described further, with reference to FIG. 2, which may execute a standard four-party payment process (e.g. with merchant, acquirer, payment scheme and issuer).

The transaction information includes payment vehicle credentials of a payment vehicle for use in processing the transaction, and transaction details defining the transaction. The payment vehicle may be any appropriate payment vehicle such as a debit card, credit card, loyalty rewards card (i.e. a card by which to accumulate or redeem loyalty points or rewards). Accordingly, the payment vehicle credentials may by one or more of a credit, debit, pre-paid or loyalty card number, expiry date, card verification value (CVV), issuer and/or payment scheme, virtual or digital wallet identifier, other relevant information derivable from the payment vehicle, or a reference indication—e.g. a quick response (QR) code, barcode or other code by which the relevant information can be obtained.

The transaction details define the transaction. The transaction details may include a transaction value—the amount of a particular currency or rewards points balance necessary to settle the transaction, a transaction number or receipt number by which to track the transaction between terminals and systems during processing of the transaction, a basket—e.g. the products sought to be purchased by the transaction, and so forth.

In the present embodiments, the POS terminal 202 is itself incapable of processing transaction using the transaction information. To that end, after receiving the transaction information at step 102, the POS terminal 202 determines that it cannot process the transaction—Step 104.

The POS terminal 202 may determine that it is incapable of processing the transaction, in a variety of ways. In general, a POS terminal 202 will comprise at least one application. The application will typically come pre-installed on the POS terminal, in non-transitory memory or storage in the POS terminal 202. Such applications are used for processing a particular type of payment vehicle, for example, a credit or debit card, a card from a particular issuer or payment scheme such as MasterCard®, Visa® or American Express®, or particular types of transactions such as credit transactions, debit transactions, savings transactions, chequing transactions, refund transactions or loyalty/rewards transactions.

Where the POS terminal 202 comprises such an application, the application will typically accept payment vehicle (i.e. facilitate processing of a transaction) if the payment vehicle credentials, such as credit card or debit card number, are in a certain, predetermined format. That format indicates the type of card or payment vehicle. Accordingly, determining that the POS terminal 202 cannot process the transaction will include a process involving comparing the payment vehicle credentials to one or more predetermined payment vehicle credential formats for each application. If the POS terminal 202 determines that the payment vehicle credentials conform to none of the one or more predetermined payment vehicle credential formats, it has thus determined that it cannot process the transaction.

The POS terminal 202 may instead, or in addition, be limited in the type of payment vehicle it can use to process a transaction—payment vehicle types may include a credit card, a debit card, a savings card, and electronic funds transfer point of sale (EFTPOS) card, or a loyalty or rewards scheme card. The POS terminal 202 may thus determine that it cannot process the transaction by identifying the "type" of the payment vehicle. This may be achieved by the type of payment vehicle being specifically manually entered—e.g., by selecting one of the "savings", "credit" and "cheque" buttons on a POS terminal—or may be determined based on the payment vehicle credentials taken from the payment vehicle itself—e.g. the issuer and payment scheme can be determined from the payment vehicle number, and can then be cross-referenced against the issuers or payment schemes for payment vehicles that can be used with any particular application. The POS terminal 202 then compares the type of the payment vehicle to one or more types of transaction capable of being processed by the POS terminal. For example, a POS terminal 202 may only be capable of processing credit transactions, and even then may only be capable of processing credit transactions through a limited number of credit card issuers or payment schemes. If the payment vehicle is not a credit card, or is not a credit card from the limited number of credit card issuers or payment schemes, the POS terminal 202 will be unable to process the transaction. The POS terminal 202 determines that it cannot process the transaction by identifying or determining that a type of the transaction associated with the payment vehicle (e.g., a credit transaction for a payment vehicle that is a credit card) is none of the one or more types of transaction it is capable of processing. On determining that, for example, the payment vehicle is a debit card, the POS terminal 202 recognises that a debit transaction is clearly not a credit transaction, and since the POS terminal 202 is only capable of performing some credit transactions it determines that it is incapable of processing the transaction.

The POS terminal 202 may also determine it cannot process the transaction based on the type of transaction being identified in, or identifiable from, the transaction details. In this case, the type of transaction may be, for example, a credit transaction, a debit transaction, a refund transaction, a checking transaction, a savings transaction or a loyalty program transaction. This may be achieved in a variety of ways, often including selection of, for example, one of the check, savings or credit buttons on the POS terminal 202. Despite all buttons being provided on many past terminals, some of those POS terminals 202 are not capable of servicing or processing transactions associated with some of the functions its own buttons purport to provide.

Again, after determining what type of transaction is being endeavoured to be performed, the POS terminal 202 compares that type of transaction to one or more types of transaction it is capable of processing using the application or applications installed on the POS terminal 202. On determining that the type of the transactions is none of the one or more types of transaction, the POS terminal 202 has thus determined that it cannot process the transaction.

Step 106 comprises sending the transaction information from the POS terminal 202 to an application support terminal 204. The application support terminal 204 is a terminal that comprises one or more applications, for processing one or more different types of transaction or payment vehicle that is not supported by the one or more transactions installed on the POS terminal 202 in question. Thus the payment vehicle credentials can be used with one of the applications installed on the application support terminal 204 to affect the transaction.

The application support terminal 204 may be another POS terminal, such as a hardwired or mobile EFTPOS terminal, a computer system comprising, for example, a payment gateway or any other appropriate system that can process transactions using payment vehicle credentials. In some cases, where a merchant 212 has multiple terminals 202, 204 and some of those multiple terminals 202, 204 have different applications installed thereon when compared with the application or applications installed on others of those terminals 202, 204, it may be useful to send the transaction information to a central host system 206 that then determines where to send the transaction information—i.e. to which other terminal 202, 204—in order to have the transaction processed.

To this end, sending the transaction information to the application support terminal 204 may include sending the transaction information from the POS terminal 202 to the central host system 206 and having that central host system 206 send the transaction information to the application support terminal 204. In either case, each device—i.e. the POS terminal 202, central host system 206 and application support terminal 204—will identify the other devices using the respective MAC addresses for those devices, and send relevant data, such as the transaction information, using the relevant MAC address as the destination for the data. The use of MAC addresses, and addressing formats or conventions in general, is well known in the art and need not be described in detail here. It will be understood that the sending of information from one device or system to another will involve the requisite addressing processes to be implemented.

The application support terminal 204 may be one of a plurality of supplementary POS terminals. Supplementary POS terminals are terminals in addition are other POS terminals to which the POS terminal 202 may be able to send transaction information for the purpose of processing a transaction the POS terminal 202 is incapable of processing. The supplementary POS terminals may be, owned by the same merchant. Thus the collective group of terminals 202, 204 owned by that merchant are capable of processing a wider variety of transactions, with a wider variety of payment vehicles, than any one of the POS terminals could process when taken alone.

As discussed above in respect of the application support terminal 204, each supplementary POS terminal comprises one or more applications. Each application is used for processing a particular type of transaction (e.g. credit or debit transaction, or MasterCard® or Visa® transaction). Since there are multiple supplementary POS terminals, sending the transaction information from the central host system 206 to the application support terminal 204 may require the central host system 206 to identify the relevant application support terminal from the plurality of supplementary POS terminals.

The application support terminal 204 may be identified in a variety of ways. For example, the central host system 206 may have a list of terminals 202, 204 and, for each terminal 202, 204, a list of applications installed on the respective terminal that can be used to process transaction using particular payment vehicles (e.g. credit or debits cards, or cards from particular issuers or payment schemes). Each application in the list of applications may be stored with information identifying the format of payment vehicle number (e.g. credit card number) the application can use to process a transaction, or other information such as issuer details of issuers the cards of which can be used with the respective application. The central host system 206 may then analyse the payment vehicle number (e.g. credit card number) or other data contained in the transaction information (e.g. the manual selection of a "credit", "savings" or "cheque" button on the POS terminal 202) and compare it to the information stored with each application, to determine if the respective application can process the transaction. In this manner, the central host system 206 knows which terminals will be capable of processing any particular transaction. Thus the central host system 206 identifies the application support terminal 204 on the basis that the application support terminal comprises the application necessary for, or capable of, processing the application using the payment vehicle credentials.

Once the central host system 206 has identified the application support terminal 204 comprising the relevant application, the central host system 206 sends the transaction information to the application support terminal 204.

Notably, some merchants 212 will have multiple terminals 202, 204 that provide the application that is absent from the POS terminal 202 in question. The central host system 206 may thus identify two supplementary POS terminals 202, 204, in some cases more than 2, each comprising the necessary application for processing the transaction using the payment vehicle credentials. In these cases, the central host system 206 needs to identify which of the two (or more) supplementary POS terminals 202, 204 is the terminal to which it should send the transaction information to facilitate processing of the transaction.

To achieve this, the central host system 206 may poll the two or more supplementary POS terminals 202, 204 to ascertain which of those terminals 202, 204 is not currently involved in processing a transaction. This is to avoid some delays in cases where transaction information is routed to a busy supplementary POS terminal 202, 204, when it could have been routed to an idle supplementary POS terminal 202, 204.

After polling the supplementary POS terminals 202, 204, the central host system 206 may send the transaction information to the first of the supplementary POS terminals 202, 204 to respond with a notification advising it is not currently involved in processing a transaction. The first to respond supplementary POS terminal 202, 204, will thus be the application support terminal 204.

In particularly busy merchant premises, it may be that all terminals 202, 204 that are capable of processing the transaction in question are occupied. In this case, the central host system 206 may repeatedly poll the supplementary POS terminals 202, 204 until one of them is free, or may schedule the transaction to be performed on a particular supplementary POS terminal 202, 204 upon completion of the transaction being processed by that particular supplementary POS terminal 202, 204. The central host system 206 may use a different type of load balancing algorithm or process to identify the application support terminal 204 once it becomes available. In addition, the central host system 206 may queue transactions so that it can accept information from multiple POS terminals and send the information for each transaction in sequence, or when a relevant application support terminal 204 becomes available. Queueing of requests can be performed in any known manner.

Notably, it may be that the POS terminal 202, or each of the terminals 202, 204, has no pre-installed applications for processing transactions. Instead, transaction information may be routed to the application support terminal, which may be the central host system 206, in all cases. This would provide a single point of transaction processing, with entry points simply being terminals 202, 204 that are capable of assembling the transaction information and sending it to the central host system 206. In this circumstance, the central host system 206 may be a POS terminal, or may be a computing system that has access to, for example, a payment gateway or another mechanism for performing transactions with a wide variety of payment vehicles for use in a wide variety of transaction types.

Once the application support terminal 204 has received the transaction information, the application support terminal 204 processes payment for the transaction—Step 108.

Payment for the transaction may be processed in accordance with any procedure, such as the known four-party processing procedure. To achieve this, the central host system 206, or application support terminal 204, may communicate via a network 208, or any other communication mechanism, with processing network 210. The application support terminal 204, or central host system 206, may be able to communicate with the processing network 210 through standard communication protocols provided for by communications network 208, in order to receive requests for payment authorization, process such requests, and convey responses back to the application support terminal 204 or central host system 206. In some embodiments, the central host system 206 is part of the processing network 210. Similarly, the application support terminal 204 may be, or may be part of, the central host system 206.

The processing network 210 may comprise an acquirer system (which may in turn comprise a core banking system in communication with an acquirer processor system), a payment network (such as Mastercard, Visa or China Unionpay) and an issuer system (which may comprise a core banking system and an issuer processor system). Advantageously, the processing network 210 can also include a digital wallet provider system.

The processing network 210 may receive the payment authorization request via the acquirer system, which routes the request via the payment network to the issuer system in a manner known in the art. The request may be formatted according to the ISO 8583 standard, for example, and may comprise a primary account number (PAN) of the payment vehicle being used for the transaction, a merchant identifier (MID) uniquely identifying the merchant to whom the POS terminal 202 and application support terminal 204 belong, and an amount of the transaction, as well as other transaction-related information as will be known by those skilled in the art. The issuer system receives the request, applies authorization logic to approve or decline the request, and sends an authorization response (approve or decline, optionally with a code indicating the reason for the decline) back to the acquirer system via the payment network in known fashion. The acquirer system then communicates the authorization response to the processing network 210 which relays that information to the application support terminal 204 or the central host system 206.

In addition to processing requests for payment in which funds are actually transferred from the cardholder's account (maintained in the issuer's core banking system) to the merchant's account (maintained in the acquirer's core banking system), the processing network 210 may process a pre-authorization (or "pre-auth") request, in which funds are not transferred on approval of the request, but are instead placed on hold. The pre-auth can later be completed, for example by the merchant's point of sales system or the processing network 210, in order to release the funds. Alternatively, the pre-auth can be cancelled, thus effectively cancelling the transaction. The processing network 210 may instead substitute a currency equivalent, such as rewards points or loyalty points, for the monetary value or part of the monetary value of the transaction amount.

The application support terminal 204, at Step 110, then forwards a transaction confirmation notification to the POS terminal 202. The transaction confirmation notification specifies whether the transaction was successfully or unsuccessfully processed. The POS terminal 202 may then print a receipt or otherwise output the results of the transaction, successful otherwise, in the usual manner.

Figure 6:
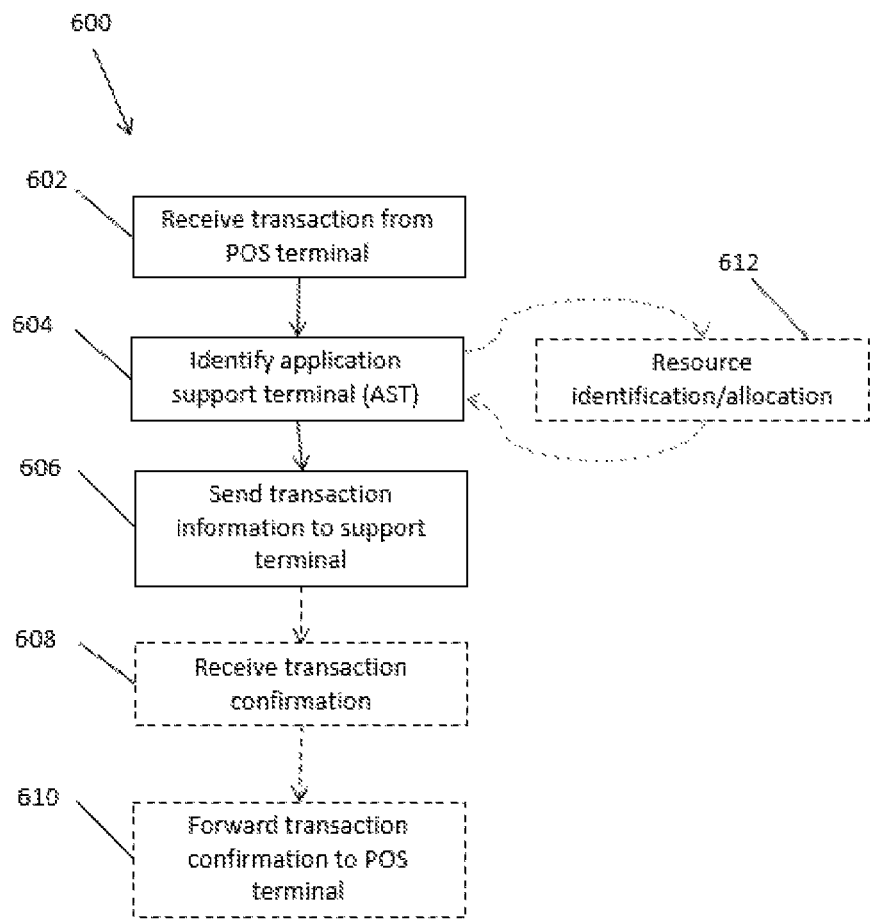
FIG. 6 illustrates a computer process performed by the central host system.
Figure 7:
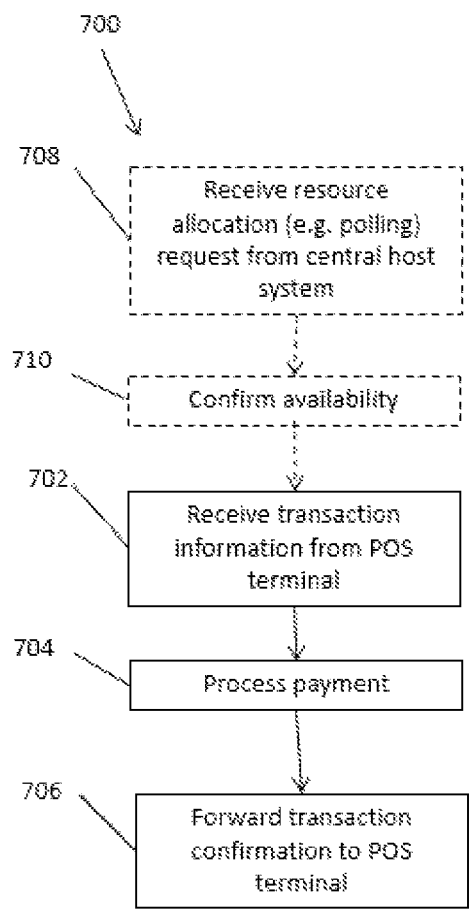
FIG. 7 illustrates a computer process performed by the AST.
Figure 8:
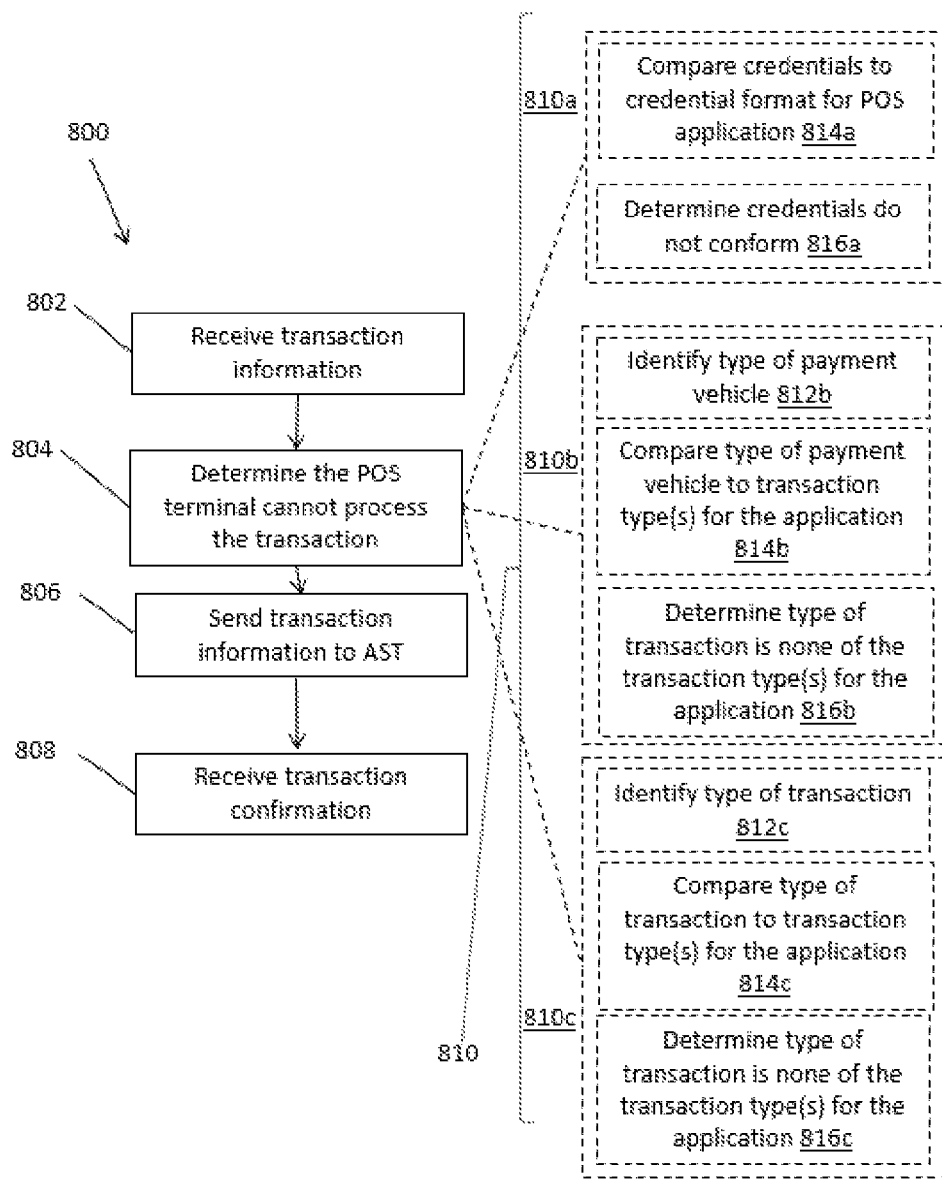
FIG. 8 illustrates a computer process performed by the POS terminal.

FIGS. 6 to 8 show processes 600, 700, 800 performed by the central host system 206, the AST 204 and the POS 202 system respectively. The processes 600, 700, 800 may be performed using the network 900 as shown in FIG. 3.

Figure 3:
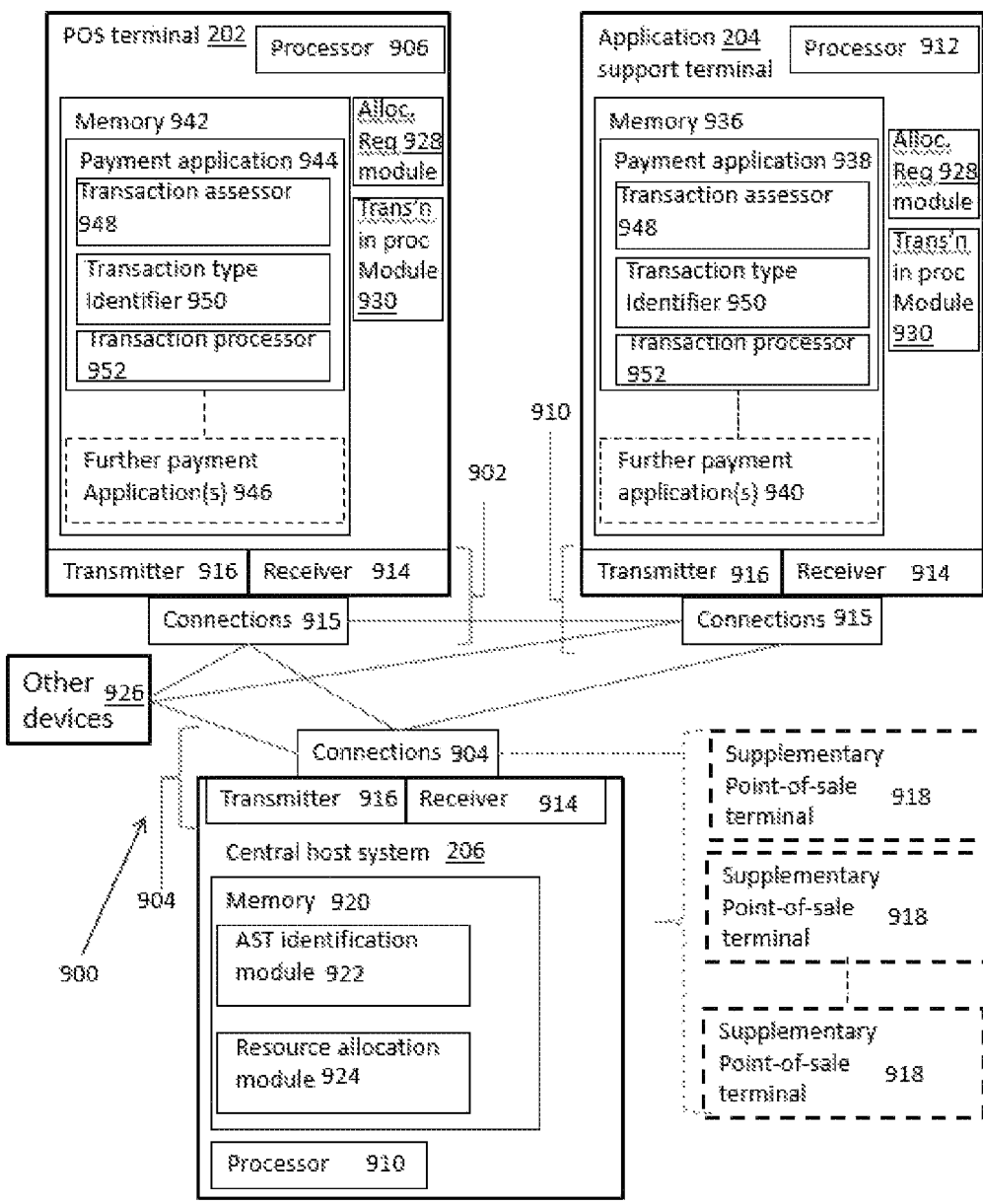
FIG. 3 provides a schematic embodiment of a POS terminal, application support terminal (AST) and central host system.

With reference to FIGS. 3 and 6, the process 600 is performed in embodiments where the central host system 206 is used to route information from the POS terminal 202 to the AST 204 and/or in forwarding the payment confirmation notification to the POS terminal 202. The process 600 broadly comprises:

Step 602: receiving transaction details from the POS terminal 202;

Step 604: identifying the application support terminal (AST) 204;

Step 606: sending transaction information to the AST 204;

Step 608: receiving transaction confirmation; and

Step 610: forwarding the transaction confirmation to the POS terminal 202.

At step 602, the central host system 206 receives the transaction information from the POS terminal 202. The transaction information is sent from input/output (I/O) interface 902 of the POS terminal 202 to I/O interface 904 of the central host system 206. The transaction information includes all data necessary to process a transaction such as, for example, payment vehicle credentials, PIN, MAC address for POS terminal, transaction amount and an MID. The step of sending the transaction information to the central host system is discussed with reference to step 106 of FIG. 1 and it will be clear that receiving step 602 involves the receipt of that which is sent in accordance with step 106. The I/O interface 902, together with the processor 906, may format the transaction information in any desired format. Similarly, the I/O interface 904, together with processor 908, may receive the transaction information in any desired format. The processor 908 and I/O interface 904 may then reformat the transaction information, if necessary, to ensure it can be interpreted by AST 204. The I/O interface 910 and processor 912 of the AST 204 may also be configured to receive the transaction information and reformat it, if necessary, to enable it to be processed by an application stored in the AST 204 as discussed with reference to FIG. 7.

Accordingly, the I/O interfaces 902, 902, 910 may, together with their respective processors, 906, 908, 912, receive any information in any desired format and reformat that information for processing or for forwarding to a further device.

In each case, the respective I/O interface 902, 904, 910 may comprise one or more ports or other connections 915, a receiver 914 and transmitter 916 the roles and operation of which will be understood by the skilled person. While receivers 914, connections 915 and transmitters 916 are shown as separate units, it will be understood that they may form a single unit or component in each respective device, or may be combined in any desired combination without changing their function.

The POS terminal 202 may send the transaction information to the central host system 206 so that the POS terminal 202 does not need to identify the AST 204 or does not need to wait for the AST 204 to become available. Routing transaction information through a central host system 206 that identifies the AST 204 then removes the need to update each POS terminal with the details of any new terminals that become available on a network of POS terminals (i.e. the POS terminal, any supplementary POS terminals and the central host system), any POS terminals that are removed from that network and any updates to the capabilities of other POS terminals on the network (e.g. adding the ability for a POS terminal to accept credit card transactions where previously it was unable to do so). This also avoids the need for each POS terminal to maintain a database of other POS terminals on the network, and of the applications installed on each of those terminals and to loaded with applications for identifying the AST 204. Instead, the POS terminal 202 may route all relevant transactions through the central host system 206.

At step 604, the central host system 206 identifies the AST 204. This can be achieved in a variety of ways, which are discussed with reference to step 106 of FIG. 1. Similarly, at step 606, the central host system 206 sends the transaction information to the AST and this is again discussed with reference to step 106 of FIG. 1. In some cases the AST 204 will be one of many supplementary POS terminals 918 (shown in broken lines as they may not be present in some embodiments), and more than one of those supplementary POS terminals 918 may comprise the relevant application needed to process transactions using the relevant payment vehicle. Each supplementary POS terminal 918 may comprise the same modules or components as are illustrated for the AST 204 in FIG. 3.

Where all supplementary POS terminals 918 comprising the relevant application are busy (e.g. offline or involved in processing a transaction), the central host system 206 performing process 600 may need to wait until a relevant supplementary POS terminal 918 becomes available. Thus the process 600 includes an additional step, step 612, of resource identification or allocation—identifying resources and allocating those resources involves waiting for resources to become available and, if necessary, queueing transactions and forwarding the transactions to relevant resources once those resources become available. Resource identification and allocation may involve, for example, polling the supplementary POS terminals 918 until one becomes available and, in the interim, queueing transactions. The skilled person will appreciate that the "polling" process may be substituted for any appropriate resource allocation algorithm or process, and will still fall within the scope of the present disclosure.

To identify the AST 204, the central host system 206 comprises memory 920. The memory 920 may be distributed across multiple components or computer systems, or may reside in a single hardware module. The memory 920 comprises an AST identification module 922 and a resource allocation module 924. The AST identification module 922 identifies the AST by its MAC address and may comprise, for example, a list of supplementary POS terminals 918 (including the AST 204), a list of applications stored on each of those supplementary POS terminals 918 and the types of payment vehicles or transaction that can be processed by the respective application. Thus, the AST identification module 922 may identify, from all supplementary POS terminals 918, the one or more supplementary POS terminals 918 comprising an application capable of processing the transaction.

The resource allocation module 924 then identifies the AST 204 from the supplementary POS terminals 918 identified by the AST identification module 922 as being capable of processing the transaction. Any resource allocation process may be used to allocate the AST 204, such as the polling process mentioned with reference to step 106 of FIG. 1.

Step 608 involves receiving a transaction confirmation notification by the central host system 206 through I/O interface 904. A transaction confirmation notification is a notification that advises whether or not a transaction was successfully processed (e.g. whether there were sufficient funds or rewards points associated with the payment vehicle to pay the transaction amount).

Since the AST 204 forwards the transaction details to the issuer (which may include sending the transaction information via a merchant's acquirer, payment scheme and/or other party) the issuer may send the transaction confirmation notification to the AST 204. In this case, the central host system 206 receives the transaction confirmation notification from the AST 204. The central host system 206 may alternatively receive the transaction confirmation notification directly from the issuer (represented by "Other devices" block 926)—in this case the MAC address for the central host system 206 will need to have been added to the transaction information for the issuer to send the transaction confirmation notification to the correct address. The issuer or AST 204 may instead forward the transaction confirmation notification directly to the POS terminal 202, thus bypassing the central host system 206. Thus steps, such as step 608, that may not be performed in all cases are shown in broken lines.

Step 610 involves forwarding the transaction confirmation notification to the POS terminal 202, from I/O interface 904 to I/O interface 902. This is discussed with reference to step 110 of FIG. 1. Again, where the central host system 206 is bypassed when the transaction confirmation notification is sent, step 610 will not be performed and has thus been shown in broken lines.

FIG. 7 shows a process 700 performed by the AST 204. The process 700 enables the AST 204 to receive transaction information, via I/O interface 910, and process payment for the transaction. The process 700 broadly comprises:

Step 702: receiving transaction information from the POS terminal;

Step 704: processing payment for the transaction; and

Step 706: forwarding a transaction confirmation notification to the POS terminal.

In some embodiments, such as those where there are multiple supplementary POS terminals as described above, the process 700 may further include receiving a resource allocation request—step 708. This may be a polling request or other resource allocation request as will be understood by the skilled person.

In some embodiments, the AST comprises an allocation request module 928 that returns a message advising whether or not the AST 204 is involved in processing a transaction. To achieve this, the resource allocation request is received by the allocation request module 928 which queries, or forwards the request to, a transaction in process module 930. The transaction in process module 930 determines if the AST 204 is processing a transaction and, if so, forwards a message via the allocation request module 928 to the central host system 906 to advise the AST is processing a transaction. In other embodiments, if the AST 204 is busy processing a transaction, then it will not receive the request.

If the AST is not involved in processing a transaction, the transaction in process module 930 will return an 'available' message to advise the AST 204 is ready to process a transaction.

Steps 708 and 710 may be performed in a known manner, such as by pinging the AST and any other supplementary POS terminals (or a subset thereof known to have the relevant application installed), with the AST 204 or other supplementary POS terminal either not responding, or responding with a 'busy' message, when unavailable to process the transaction, and/or by responding with an 'available' message when available to process the transaction.

Steps, 702, 704 and 706 are discussed with reference to steps 106, 108 and 110 of FIG. 1. In this regard, transaction information is received through I/O interface 910 and receiver 914 from the POS terminal 202 or central host server 206.

The AST 204 further comprises a memory 936 for storing at least one application 938, and preferably one or more further applications 940, each being for processing a particular type of transactions—e.g., a credit transaction, debit transaction or other transaction as described above, or transactions involving the payment vehicles of particular issuers or payment schemes. For the AST 204 to be involved in processing a transaction, where the transaction information has been received from the POS terminal 202, at least one of the payment application 938 and/or further payment application(s) 940 must be absent from the memory 942 of the POS terminal 202, and must be capable of processing the transaction.

Applications 938, 940 contain modules 948, 950 that determine whether the respective application 938, 940 is capable of processing a particular transaction and module 952, that processes the transaction. The operation of applications, and of modules 948, 950, 952, is discussed with reference to application 944, further application(s) 946, and modules 948, 950, 952 of the POS terminal 202.

FIG. 8 illustrates a process 800 performed by the POS terminal 202 of FIG. 3. The process 800 enables a POS terminal to facilitate processing of transactions for which it does not have the relevant application installed. The process 800 broadly comprises:

Step 802: receiving transaction information;

Step 804: determining that the POS terminal 202 cannot process the transaction;

Step 806: sending the transaction information to the AST 204; and

Step 808: receiving a transaction confirmation notification.

The process 800 further includes a group of sub-processes 810, comprising steps 810a, 810b and 810c, each of which provides a different routine for determining whether the POS terminal 202 can process a given transaction.

Steps 802, 804, 806 and 808 are discussed with reference to steps 102, 104, 106 and 110 of FIG. 1, respectively. Of course, step 110 refers to 'forwarding' a transaction confirmation notification to the POS terminal 202, which naturally involves that notification being 'received' by the POS terminal 202 in accordance with step 808.

The POS terminal 202 includes the same allocation request module 928 and transaction in process module 930 as those within the AST 204. Modules 928, 930 will not be provided in some embodiments. However, in the present case they enable the POS terminal 202 to be involved in resource allocation processes by the central host system 206. The POS terminal 202 may thus act as the AST for transactions that the present AST 204, or one of the supplementary POS terminals 918, is unable to perform.

Sub-processes 810a, 810b and 810c each perform a different assessment of whether or not the POS terminal 202 is capable of processing a particular transaction. These steps are implemented by the transaction assessor module 948, and transaction type identifier module 950 of the application 944. The same or similar modules may be present in each of application(s) 946, 938 and 940.

For a transaction being performed directly on the POS terminal 202, the transaction assessor module 948 assesses whether that transaction matches the type of transaction as identified by the transaction type identifier module 950.

Sub-process 810a provides a sequence of steps in which the format of payment vehicle credentials is used to assess whether or not the particular application is capable of processing the transaction—this is also discussed with reference to step 104 of FIG. 1. At step 814a, the payment vehicle credentials of a payment vehicle being used in the transaction are compared to the format of payment vehicle credentials suitable for processing using the application. For example, the application may process transactions using credit card numbers of a particular format, CCV numbers of a particular format and so on. The transaction assessor module 948 compares the format of the payment vehicle credentials being used to perform the transaction to the format of payment vehicle credentials that can be processed using the application. This can be achieved, for example, by a linear comparison of two sets of credentials (i.e. treating them as character strings) or via any other desired method.

The transaction assessor module 948 then determines, based on the comparison performed at step 814a, whether the credentials conform with the relevant format—step 816a. If the credentials do not conform, the application rejects the transaction. If the credentials conform with the required format, the transaction processor module 952 processes the transaction in a known manner.

Steps 810b and 810c consider the 'type' of payment vehicle and transaction when determining whether or not a particular application can process the transaction. To facilitate this process, the transaction type identifier module 950 identifies the 'type' of the transaction. Step 810b describes a process involving an assessment of the 'type' of the payment vehicle. In this regard, module 950 identifies a type of the payment vehicle based on the payment vehicle credentials—step 812b. The payment vehicle may be, for example, a debit card, credit card, loyalty awards card, pre-paid card or other type of card. Thus the type of the payment vehicle is credit, debit, loyalty awards, or pre-paid, respectively.

At step 814b, the transaction assessor module 948 then compares the type of the payment vehicle to one or more types of transaction capable of being processed by the application. The result of that comparison is then used, at step 816b, to determine whether the type of the transaction associated with the payment vehicle is a type that is suitable for processing by the application. In accordance with the process 100 of FIG. 1, the outcome of that determination would be that the POS terminal 202 is incapable of processing the application. Where the transaction information has been forwarded to the AST 204, in accordance with step 106 of FIG. 1, the similar module 948 in the AST 204 would determine the application is capable of processing the transaction and the transaction would then be processed by module 952.

Sub-process 810c involves assessment of the type of transaction, rather than the type of the payment vehicle—this is also discussed with reference to step 104 of FIG. 1. At step 812c, transaction type identifier module 950 identifies a type of the transaction. This may involve the type of the transaction being inputted, for example, by selection of a "credit", "cheque" or "savings" button on the POS terminal. At step 814c, transaction assessor module 948 compares the type of the transaction to one or more types of transaction capable of being processed by the application. Based on the result of that comparison the transaction assessor module 948, at step 816c, determines whether or not the type of the transaction is one that is suitable for processing using the application. In accordance with the process 100 of FIG. 1, the outcome of that determination would be that the POS terminal 202 is incapable of processing the application. Where the transaction information has been forwarded to the AST 204, in accordance with step 106 of FIG. 1, the similar module 948 in the AST 204 would determine the application is capable of processing the transaction and the transaction would then be processed by module 952.

If the type of the transaction is one that the application is able to process, the transaction processor module 952 processes the transaction via the I/O interface 902 in the usual manner.

Figure 4:
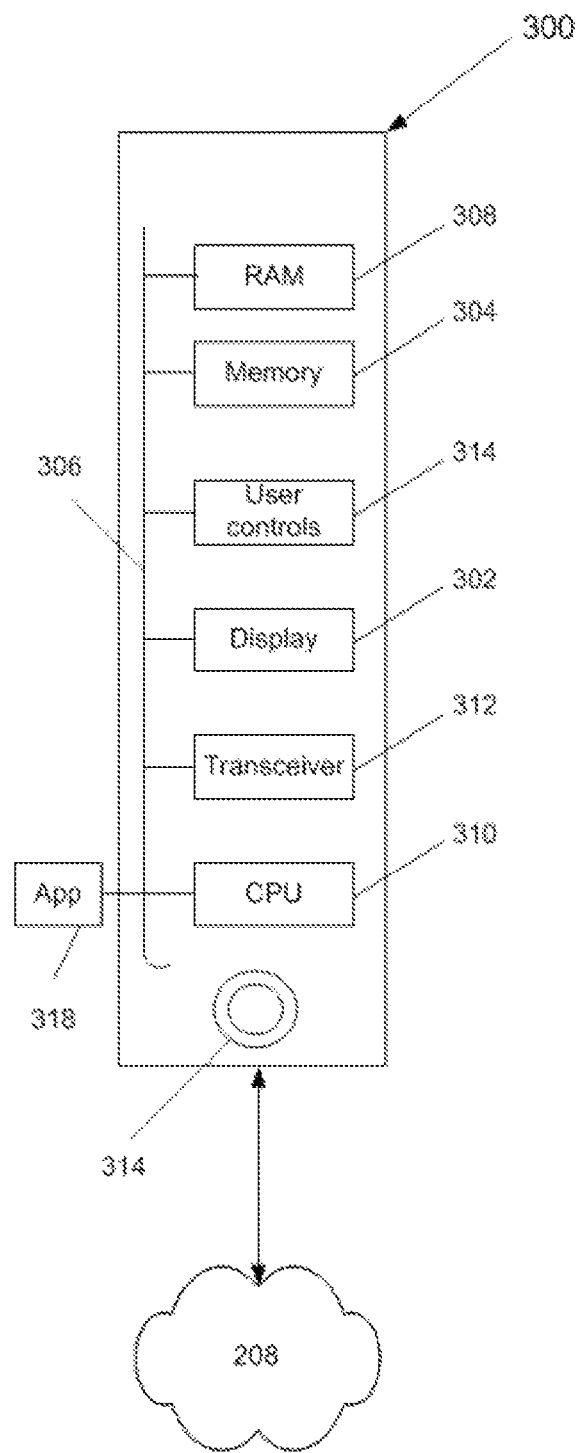
FIG. 4 provides a schematic diagram of a POS terminal, application support terminal and central host system.

FIG. 4 is a block diagram showing a terminal 300 which may be a POS terminal, application support terminal or central host system such as those referred to by 202, 204 and 206 in FIG. 2. The terminal 300 may be a mobile terminal such as a mobile POS terminal, a personal data assistant (PDA) or smartphone enabled for receipt of payments, a laptop or palm-top computer and so on. For ease of description, the terminal 300 is described below, by way of non-limiting example, with reference to a POS terminal.

As shown, the terminal 300 comprises the following components in electronic communication via a bus 306:

(a) a display 302;
(b) non-volatile (non-transitory) memory 304;
(c) random access memory ("RAM") 308;
(d) N processing components 310;
(e) a transceiver component 2300 that comprises N transceivers; and
(f) user controls 314.

As a minimum, the terminal 300 will include at least one processor, such as CPU 310, and at least one non-transitory storage medium such as memory 304, that stores instructions for execution by the one or more processors to facilitate performance of the computer process described with reference to FIG. 1.

Although the components depicted in FIG. 4 represent physical components, FIG. 4 is not intended to be a hardware diagram. Thus, many of the components depicted in FIG. 4 may be realized by common constructs or distributed among additional physical components. Moreover, it is certainly contemplated that other existing and yet-to-be developed physical components and architectures may be utilized to implement the functional components described with reference to FIG. 4.

The display 302 generally operates to provide a presentation of content to a user, and may be realized by any of a variety of displays (e.g., CRT, LCD, HDMI, micro-projector and OLED displays).

In general, the non-volatile or non-transitory storage medium 304 (also referred to as non-volatile memory) functions to store (e.g., persistently store) data and executable code including code that is associated with the steps of the computer process described with reference to FIG. 1.

In some embodiments for example, the non-volatile memory 304 comprises bootloader code, modem software, operating system code, file system code, and code representing the one or more application for processing transactions relating to a corresponding one or more payment vehicles or type of transaction, as well as other components, known to those of ordinary skill in the art, which are not depicted nor described for simplicity.

In many implementations, the non-volatile memory 304 is realized by flash memory (e.g., NAND or ONENAND memory), but it is certainly contemplated that other memory types may be utilized as well. Although it may be possible to execute the code from the non-volatile memory 304, the executable code in the non-volatile memory 304 is typically loaded into RAM 308 and executed by one or more of the N processing components 310.

The N processing components 310 in connection with RAM 308 generally operate to execute the instructions stored in non-volatile memory 304. As one of ordinarily skill in the art will appreciate, the N processing components 310 may comprise a video processor, modem processor, DSP, graphics processing unit (GPU), and other processing components.

The transceiver component 312 comprises N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks. For example, each transceiver may also correspond to a GPS receiver for geo-location.

It should be recognized that FIG. 4 is merely an example and, in one or more example embodiments, the functions described herein may be implemented in hardware, software, firmware, or any combination thereof. If implemented in software, the functions may be stored on or transmitted over as one or more instructions or code encoded on a non-transitory computer-readable medium 304. Non-transitory computer-readable medium 304 comprises both computer storage medium and communication medium including any medium that facilitates transfer of a computer program from one place to another. A storage medium may be any available medium that can be accessed by a computer.

Figure 5:
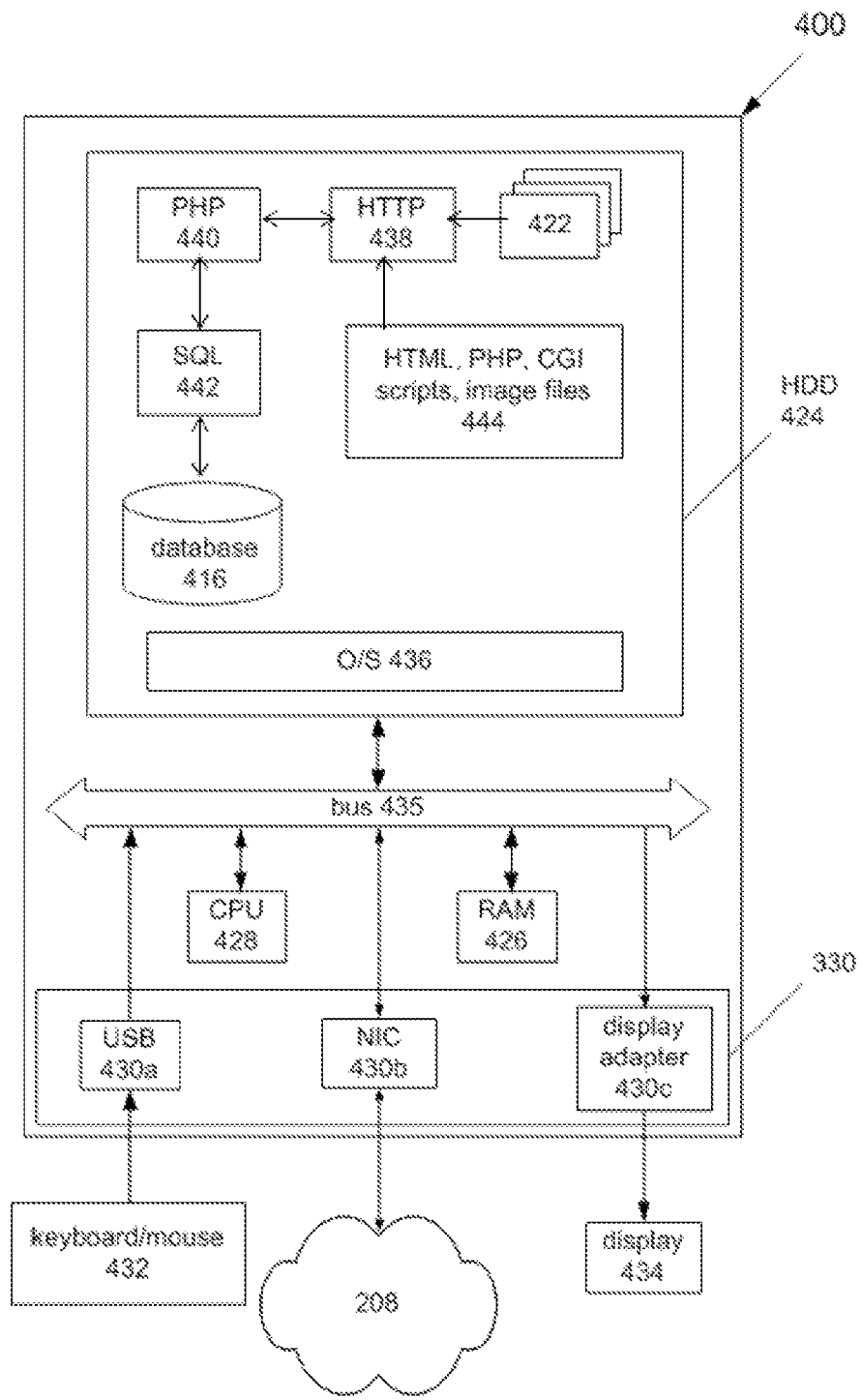
FIG. 5 provides a schematic diagram of a payment network system, or part thereof, or a central host system.

As shown in FIG. 5, the central host system 206 or processing network 210 may comprise a computer system 400. In some embodiments, the central host system 206 or processing network 210 may comprise multiple servers in communication with each other, for example over a local area network or a wide-area network such as the Internet. The central host system 206 or processing network 210 is able to communicate with other components of the system 200 over the wireless communications network 208 using standard communication protocols.

The components of the central host system 206 or processing network 210 can be configured in a variety of ways. The components can be implemented entirely by software to be executed on standard computer server hardware, which may comprise one hardware unit or different computer hardware units distributed over various locations, some of which may require the communications network 208 for communication. A number of the components or parts thereof may also be implemented by application specific integrated circuits (ASICs) or field programmable gate arrays. Notably, each of the devices 202, 204, 206, 210 may communicate over the network 208.

In the example shown in FIG. 5, the processing network 210 is a commercially available server computer system based on a 42 bit or a 64 bit Intel architecture, and the processes and/or methods executed or performed by the processing network 210 are implemented in the form of programming instructions of one or more software components or modules 422 stored on non-volatile (e.g., hard disk) computer-readable storage 424 associated with the processing network 210. At least parts of the software modules 422 could alternatively be implemented as one or more dedicated hardware components, such as application-specific integrated circuits (ASICs) and/or field programmable gate arrays (FPGAs).

The system 400 comprises one or more of the following standard, commercially available, computer components, all interconnected by a bus 435:
(a) random access memory (RAM) 426;
(b) at least one computer processor 428, and
(c) external computer interfaces 430:
  (i) universal serial bus (USB) interfaces 430a (at least one of which is connected to one or more user-interface devices, such as a keyboard, a pointing device (e.g., a mouse 432 or touchpad),
  (ii) a network interface connector (NIC) 430b which connects the computer system 400 to a data communications network, such as the wireless communications network 208; and
  (iii) a display adapter 430c, which is connected to a display device 434 such as a liquid-crystal display (LCD) panel device.

The central host system 206 or processing network 210 comprises a plurality of standard software modules, including:
(a) an operating system (OS) 436 (e.g., Linux or Microsoft Windows);
(b) web server software 438 (e.g., Apache, available at http://www.apache.org);
(c) scripting language modules 440 (e.g., personal home page or PHP, available at http://www.php.net, or Microsoft ASP); and
(d) structured query language (SQL) modules 442 (e.g., MySQL, available from http://www.mysql.com), which allow data to be stored in and retrieved/accessed from a database 416 (i.e. memory), which may be an SQL database.

Advantageously, the database 416 forms part of the computer readable data storage 424. Alternatively, the database 416 is located remote from the computer system 400 shown in FIG. 5. In this regard, any processor, memory or other system 4400 component described herein may comprise a single module in a single computing system, or may comprise multiple modules distributed over multiple computing systems.

Together, the web server 438, scripting language 440, and SQL modules 442 provide the system 400 with the general ability to allow the other components of the system 10 to communicate with the system 400 and in particular to provide data to and receive data from the database 416. It will be understood by those skilled in the art that the specific functionality provided by the system 400 to such users (i.e. terminals 202 and 204, and 206 where appropriate) is provided by scripts accessible by the web server 438, including the one or more software modules 422 implementing the processes performed by the central host system 206 or processing network 210, and also any other scripts and supporting data 444, including markup language (e.g., HTML, XML) scripts, PHP (or ASP), and/or CGI scripts, image files, style sheets, and the like.

The boundaries between the modules and components in the software modules 422 are examples only, and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations in accordance with the invention. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagrams of the processes of the central host system 206 or processing network 210 may be executed by a module (of software modules 422) or a portion of a module. The processes may be embodied in a non-transient machine-readable and/or computer-readable medium for configuring a computer system to execute the method. The software modules may be stored within and/or transmitted to a computer system memory to configure the computer system to perform the functions of the module.

The central host system 206 or processing network 210 normally processes information according to a program (a list of internally stored instructions such as a particular application program and/or an operating system) and produces resultant output information via input/output (I/O) devices 430. A computer process typically comprises an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Accordingly, the above examples provide a system and computer process or method for executing a transaction, such as a financial transaction, a rewards or loyalty points transaction or otherwise. The system enables a POS terminal to facilitate transaction for which it does not have the relevant application installed. This enables a merchant to update fewer copies of the necessary applications, since multiple POS terminals can use a single instance of any one application, installed on a single POS terminal or other device. This also removes inconvenience for the consumer insofar as they are only required to visit a single terminal regardless of whether that terminal, in itself, is capable of processing the transaction using a payment vehicle of the consumer.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described. Thus, for example, it will be appreciated that features from different examples above may be used interchangeably where appropriate.

The invention claimed is:

1. A central host system for executing a computer process, between a point-of-sale (POS) terminal and an application support terminal (AST), for processing a transaction, the central host system comprising:
a host processor; and
a host memory device in communication with the host processor and storing host program instructions thereon,
wherein the host processor is operative with the host program instructions to:
receive transaction information from the POS terminal, the transaction information comprising:
payment vehicle credentials of a payment vehicle for use in processing the transaction; and
transaction details defining the transaction,
the POS terminal being unable to process the transaction;
identify the AST from a plurality of supplementary POS terminals based on the AST comprising an application capable of processing the transaction using the payment vehicle credentials;
send the transaction information to the application support terminal to facilitate processing of payment for the transaction by the AST; and
forward a transaction confirmation notification from the AST to the POS terminal, the transaction confirmation notification specifying whether the transaction was successfully or unsuccessfully processed.

2. The central host system of claim 1, the host processor being operative with the host program instructions to:
process a transaction through a POS terminal and a further POS terminal, where the transaction involves a payment vehicle for which the POS terminal does not have an appropriate application installed;
forward the transaction information to the further POS terminal that has the appropriate application installed; and
receive a transaction confirmation notification and forward the transaction confirmation notification to the POS terminal from the further POS terminal after the transaction is processed, the transaction confirmation notification specifying whether the transaction was successfully or unsuccessfully processed.

3. A central host system according to claim 1, wherein the AST is one of a plurality of supplementary POS terminals, each supplementary POS terminal comprising one or more applications, each application being for processing a particular type of transaction, and wherein the host processor is operative with the host program instructions to identify the AST from the plurality of supplementary POS terminals based on the application support terminal comprising the application capable of processing the transaction using the payment vehicle credentials.

4. A central host system according to claim 3, wherein the central host system is operative with the host program instructions to identify the AST from the plurality of supplementary POS terminals by:
identifying at least two supplementary POS terminals each comprising the application capable of processing the transaction using the payment vehicle credentials; and
polling the at least two supplementary POS terminals to ascertain which of the at least two supplementary POS terminals is not currently involved in processing a transaction, and then send the transaction information to the AST, the AST being the first of the at least two supplementary POS terminals to respond with a notification advising it is not currently involved in processing a transaction.

5. An application support terminal (AST) for processing a transaction, the AST comprising:
an AST processor; and
an AST memory device in communication with the AST processor and storing an application capable of processing the transaction using the payment vehicle credentials, and AST program instructions thereon,
wherein the AST processor is operative with the application and AST program instructions to:
receive transaction information from a point-of-sale (POS) terminal, the transaction information comprising:
payment vehicle credentials of a payment vehicle for use in processing the transaction; and
transaction details defining the transaction,
process payment for the transaction when the POS terminal is unable to process the transaction; and
forward a transaction confirmation notification to the POS terminal, the transaction confirmation notification specifying whether the transaction was successfully or unsuccessfully processed.

6. An AST according to claim 5, wherein the AST processor is operative with the application and AST program instructions to process a transaction through a POS terminal and a further POS terminal, where the transaction involves a payment vehicle for which the POS terminal does not have an appropriate application;
forward the transaction information to the further POS terminal that has the appropriate application installed; and
receive the transaction information from the further POS terminal to the POS terminal via a central host system.

7. An AST according to claim 6, wherein the AST processor is operative with the application and AST program instructions to forward the transaction confirmation notification to the POS terminal via the central host system.

8. An AST according to claim 6, wherein the AST processor is operative with the application and AST program instructions to:
receive a polling request from the central host system, the polling request requesting confirmation the AST is available to process the transaction; and
responding to the polling request by confirming the AST is available to process the transaction.

9. A point-of-sale (POS) terminal comprising:
a POS processor; and
a POS memory device in communication with the POS processor and storing POS program instructions thereon, the POS processor operative with the POS program instructions to:
receive transaction information comprising:
payment vehicle credentials of a payment vehicle for use in processing the transaction; and
transaction details defining the transaction;
determine, based on the transaction information, that the POS terminal cannot process the transaction;
send the transaction information to an application support terminal (AST) of a plurality of supplementary POS terminals, for processing the transaction, the AST comprising an application capable of processing the transaction using the payment vehicle credentials when the POS terminal is unable to process the transaction; and
receive a transaction confirmation notification from the AST, the transaction confirmation notification specifying whether the transaction was successfully or unsuccessfully processed.

10. A POS terminal according to claim 9, wherein the POS memory device further stores at least one POS application, and the POS terminal is operative with the POS program instructions to determine that the POS terminal cannot process the transaction by:
comparing the payment vehicle credentials to one or more predetermined payment vehicle credential formats for each POS application; and
determining that the payment vehicle credentials conform to none of the one or more predetermined payment vehicle credential formats.

11. A POS terminal according to claim 9, wherein the POS memory device stores at least one POS application, and the POS terminal is operative with the POS program instructions to determine that the POS terminal cannot process the transaction by:
identifying a type of the payment vehicle based on the payment vehicle credentials;
comparing the type of the payment vehicle to one or more types of transaction capable of being processed by an application of the at least one application; and
determining that a type of the transaction associated with the payment vehicle is none of the one or more types of transaction.

12. A POS terminal according to claim 9, wherein the POS memory device stores at least one POS application, and the POS terminal is operative with the POS program instructions to determine that the POS terminal cannot process the transaction by:
identifying a type of the transaction;
comparing the type of the transaction to one or more types of transaction capable of being processed by an application of the at least one POS application; and
determining that the type of the transaction is none of the one or more types of transaction.

13. A POS terminal according to claim 12, being configured to identify the type of the transaction by identifying a type of the payment vehicle based on the payment vehicle credentials.

14. A POS terminal according to claim 12, being configured to identify the type of the transaction by determining, based on the transaction details, whether the transaction is a credit transaction, a debit transaction, a refund transaction, or a loyalty program transaction.

15. A system for executing a computer process for processing a transaction, the system comprising:
a point-of-sale (POS) terminal; and
an application support terminal (AST),
wherein the POS terminal comprises:
a POS processor; and
a POS memory device in communication with the POS processor and storing POS program instructions thereon, the POS processor operative with the POS program instructions to:
receive transaction information comprising:
payment vehicle credentials of a payment vehicle for use in processing the transaction; and
transaction details defining the transaction;
determine, based on the transaction information, that the POS terminal cannot process the transaction;
send the transaction information to the AST of a plurality of supplementary POS terminals, the AST comprising:
an AST processor; and
an AST memory device in communication with the AST processor and storing an application capable of processing the transaction using the payment vehicle credentials, and AST program instructions thereon, the AST processor operative with the application and AST program instructions to:
process payment for the transaction through the AST when the POS terminal is unable to process the transaction; and
forward a transaction confirmation notification from the AST to the POS terminal, the transaction confirmation notification specifying whether the transaction was successfully or unsuccessfully processed.

16. A system according to claim 15, wherein the POS terminal comprises:
a POS processor; and
a POS memory device in communication with the POS processor and storing POS program instructions thereon, the POS processor operative with the POS program instructions to:
receive transaction information comprising:
payment vehicle credentials of a payment vehicle for use in processing the transaction; and
transaction details defining the transaction;

determine, based on the transaction information, that the POS terminal cannot process the transaction;

send the transaction information to an application support terminal (AST), for processing the transaction, the AST comprising an application capable of processing the transaction using the payment vehicle credentials; and receive a transaction confirmation notification from the AST, the transaction confirmation notification specifying whether the transaction was successfully or unsuccessfully processed.

17. A system according to claim 15, wherein the AST comprises:

an AST processor; and an AST memory device in communication with the AST processor and storing an application capable of processing the transaction using the payment vehicle credentials, and AST program instructions thereon, the AST processor operative with the application and AST program instructions to:

receive transaction information from a point-of-sale (POS) terminal, the transaction information comprising:

payment vehicle credentials of a payment vehicle for use in processing the transaction; and transaction details defining the transaction, process payment for the transaction; and forward a transaction confirmation notification to the POS terminal, the transaction confirmation notification specifying whether the transaction was successfully or unsuccessfully processed.

18. A system according to any one of claim 15 or 16, further comprising a central host terminal, wherein the POS terminal is configured to send the transaction information to the application support terminal by sending the transaction information to the central host terminal, and the central host terminal comprises:

a host processor; and a host memory device in communication with the host processor and storing host program instructions thereon, the host processor operative with the host program instructions to:

send the transaction information from the central host terminal to the application support terminal.

19. A system according to claim 18, wherein the central host terminal comprises:

a host processor; and a host memory device in communication with the host processor and storing host program instructions thereon, the host processor operative with the host program instructions to:

receive transaction information from the POS terminal, the transaction information comprising:

payment vehicle credentials of a payment vehicle for use in processing the transaction; and transaction details defining the transaction, the POS terminal being unable to process the transaction;

identify the AST based on the AST comprising an application capable of processing the transaction using the payment vehicle credentials; and send the transaction information to the application support terminal to facilitate processing of payment for the transaction by the AST.

* * * * *